US006975975B2

(12) United States Patent
Fasca

(10) Patent No.: US 6,975,975 B2
(45) Date of Patent: Dec. 13, 2005

(54) EMISSIONS MANAGEMENT AND POLICY MAKING SYSTEM

(76) Inventor: Ted S. Fasca, 204 Stoneledge Pl., Leesburg, VA (US) 20176-4959

( * ) Notice: Subject to any disclaimer, the term of this patent is extended or adjusted under 35 U.S.C. 154(b) by 1185 days.

(21) Appl. No.: 09/725,467

(22) Filed: Nov. 30, 2000

(65) Prior Publication Data

US 2002/0065581 A1 May 30, 2002

Related U.S. Application Data

(60) Provisional application No. 60/155,058, filed on Sep. 21, 1999.

(51) Int. Cl.[7] .............................................. G05B 19/18
(52) U.S. Cl. ........................... 703/6; 703/2; 60/39.182; 110/345
(58) Field of Search ...................... 703/2, 6; 60/39.182, 60/274; 700/286; 110/345

(56) References Cited

U.S. PATENT DOCUMENTS

| | | |
|---|---|---|
| 3,775,592 A | 11/1973 | Ando et al. |
| 4,628,462 A | 12/1986 | Putman |
| 5,063,506 A | 11/1991 | Brockwell et al. |
| 5,548,528 A | 8/1996 | Keeler et al. |
| 5,712,985 A | 1/1998 | Lee et al. |
| 5,797,129 A | 8/1998 | Rohan |
| 5,826,040 A | 10/1998 | Fargher et al. |
| 5,826,238 A | 10/1998 | Chen et al. |
| 5,831,876 A * | 11/1998 | Orr et al. ........................ 703/6 |
| 5,845,258 A | 12/1998 | Kennedy |
| 5,890,133 A | 3/1999 | Ernst |
| 6,230,480 B1 * | 5/2001 | Rollins, III .............. 60/39.182 |
| 6,244,857 B1 * | 6/2001 | VonDrasek et al. ........... 431/79 |
| 6,522,994 B1 * | 2/2003 | Lang .......................... 702/183 |

FOREIGN PATENT DOCUMENTS

| | | | | |
|---|---|---|---|---|
| CA | 959169 | 12/1974 | | |
| JP | 406193400 A | * | 7/1994 | ................. 454/168 |

* cited by examiner

Primary Examiner—Albert W. Paladini
(74) Attorney, Agent, or Firm—Richard C. Litman

(57) ABSTRACT

A management tool that allows a manager to review historical data and perform forecasting simulations relating to pollutant emissions from power plants and the like is disclosed. The management tool allows the outcomes of various pollution control strategies to be simulated so that the pollution control strategy which yields the optimum result for the utility company can be selected. The system of the present invention uses real time data to automatically update the input parameters to the decision making process and revise the forecasted outcomes for the various strategies considered. The management tool of the present invention includes a computer programmed to perform the aforementioned simulations and one or more continuous emission monitors (CEMs) which are in constant communication with the computer.

7 Claims, 11 Drawing Sheets

| UNIT NAME | STATION F – UNIT 2 | ▽ |
|---|---|---|
| UNIT TYPE | | ▽ |
| LOCATION | 44 | ▽ |
| FUEL | 46 | ▽ |
| QUARTER | 48 | ▽ |
| SEASON | 50 | ▽ |
| MONTH | SEPTEMBER 52 | ▽ |
| TYPE | 54 | ▽ |
| DAY | 56 | ▽ |
| DATE | | ▽ |

*Fig. 2B*

| NOx INFORMATION | | |
|---|---|---|
| AVERAGE | 0.60 | lbs/mmBTU |
| AVERAGE | 3,203 | Lbs/hr |
| AVERAGE | 1.6 | Tons/hr |
| CUMMULATIVE | 1,153 | Tons |
| GROSS GENERATION INFORMATION | | |
| AVERAGE | 557 | MW/hr |
| CUMMULATIVE | 401,320 | MW |

*Fig. 2C*

| SO2 INFORMATION | | |
|---|---|---|
| AVERAGE | 1.98 | lbs/mmBTU |
| AVERAGE | 10,405 | Lbs/hr |
| AVERAGE | 5.2 | Tons/hr |
| CUMMULATIVE | 3,746 | Tons |
| HEAT INPUT INFORMATION | | |
| AVERAGE | 5,253 | mmBTU/hr |
| CUMMULATIVE | 3,782,507 | mmBTU |

*Fig. 2D*

| CO2 INFORMATION | | |
|---|---|---|
| AVERAGE | 205.20 | lbs/mmBTU |
| AVERAGE | 1,078,010 | Lbs/hr |
| AVERAGE | 539 | Tons/hr |
| CUMMULATIVE | 388,084 | Tons |
| OPERATING INFORMATION | | |
|  | 720 | COUNTS |
| CUMMULATIVE | 720 | Hrs |

*Fig. 2E*

EMISSIONS MANAGEMENT AND POLICY MAKING SYSTEM

RELATED APPLICATION DATA

This application is based on Provisional patent application Ser. No. 60/155,058 filed on Sep. 21, 1999.

BACKGROUND OF THE INVENTION

1. Field of the Invention

The present invention relates to a management tool for reviewing historical data and performing forecasting simulations relating to pollutant emissions from power plants and the like.

2. Description of Related Art

Stricter limitations on the amounts of pollutants and so called greenhouse gases have necessarily made pollutant emissions a controlling factor in management decisions regarding the operation of electric power plants. Power generated by burning fossil fuels leads to the production of the oxides of nitrogen, collectively referred to as $NO_x$. In addition, sulfurous compounds are emitted into the air by coal burning power plants. All fossil fuel burning power plants produce carbon monoxide (CO) and carbon dioxide ($CO_2$) as byproducts of the combustion process. Carbon monoxide is produced due to incomplete combustion of hydrocarbons, is toxic, and is generally produced in lesser amounts than $CO_2$. Carbon dioxide, while not toxic itself, has been implicated as a cause of global warming due to the greenhouse effect.

Restrictions on the amounts of the aforementioned substances that may be emitted are prescribed by law and are enforced by governmental agencies. The power plant manager has several options in reducing the emission rate of these pollutants in order to comply with existing regulations. The rate of emission of all these pollutants can be reduced by reducing the overall power output of the plant. The overall power output of the plant can be reduced, and thus the pollutant output, can be reduced by planned outages and/or by purchasing power from elsewhere. Emission of sulfurous compounds such as $SO_2$ can be reduced by using gas scrubbers and/or by changing fuels from high sulfur coal to low sulfur coal or oil. Emission of nitrogen oxides can additionally be mitigated by operational changes affecting efficiency and/or combustion conditions of the power plant, by changing fuel types, and by installing Selective Catalytic Reduction (SCR) equipment. Increasing the proportion of air to fuel can help mitigate CO emissions. The emission of $CO_2$ can additionally be reduced by increasing the efficiency of the power generation process such that less fuel has to be burned for each megawatt of electricity generated. The efficiency of the power generation process can be increased by using technologies such as cogeneration and waste heat recovery.

With so many choices facing the power plant or electric utility manager in the effort to meet the cap on pollutant emissions, it becomes difficult for the manager to pick the right strategy or combination of strategies to maximize the profit to the electric utility while complying with the limits on the emission of pollutants. The need exists for a management tool that allows the electric utility manager to forecast the company's profit for every available strategy and combination of strategies for complying with the limits on pollutant emissions, and then to select the pollution control scheme that yields the maximum profit to the utility. In addition, it would be desirable for such a tool to use real time data to automatically update the input parameters to the decision making process and revise the forecasted outcomes for the various strategies considered. Such a tool would of necessity, given the voluminous amount of data that need to be processed and the need for automatic and continuous updates, have to be implemented at least in part using a computer system. Although computer implemented management system have been proposed in the art, as evidenced by the references cited below, none of the references is seen to address the problem of finding the optimum pollution control strategy for an electric power generating plant.

U.S. Pat. No. 3,775,592, issued to Masahisa Ando et al. on Nov. 27, 1973, is related to a feedback process control system. The system of Ando et al. uses pattern recognition wherein the coordinates defined by the process output specify a point on the pattern. Control signals are generated as a function of the nature of the specified point on the pattern.

U.S. Pat. No. 4,628,462, issued to Richard E. Putman on Dec. 9, 1986, is related to a control system for a cogeneration power plant which controls the power output to match the actual demand. The system of Putman does not deal with the simulation of future pollutant emissions.

U.S. Pat. No. 5,063,506, issued to John C. Brockwell et al. on Nov. 5, 1991, is related to a computerized cost optimization system for minimizing the cost of supplying parts. The computer calculates the cost of a particular supply method such as air freight, ocean freight, land freight, on site storage, and warehouse storage, and the computer then presents the results to a user.

U.S. Pat. No. 5,548,528, issued to James D. Keeler et al. on Aug. 20, 1996, is related to a virtual sensor that can function as a pollutant sensor when the actual sensor is down so as to provide uninterrupted monitoring of pollution emission. The Keeler et al. system uses a stored model of the plant and measured control inputs to the plant to generated a virtual pollution sensor output to the control system of the plant. The keeler et al. system does not generate forecasts of future pollutant emissions based on projected demand for power generation.

U.S. Pat. No. 5,712,985, issued to Michael D. Lee et al. on Jan. 27, 1998, is related to a computerized demand forecasting and production scheduling system for forecasting the demand for a particular business item.

U.S. Pat. No. 5,797,129, issued to Drius Rohan on Aug. 18, 1998, is related to a computerized control system for a multi-resource, multi-task environment where at least one resource is shared between tasks. The system of Rohan can be used to schedule tasks for optimal resource usage and elimination of bottlenecks.

U.S. Pat. No. 5,826,238, issued to Wen-Lin Chen et al. on Oct. 20, 1998, is related to a method and system for operating a data base computer system and a resource allocation computer for allocating resources within a manufacturing plant.

U.S. Pat. No. 5,826,040, issued to Hugh E. Fargher et al. on Oct. 20, 1998, is related to a method for planning the production schedule within a factory. Each job is divided into a plurality of processing segments and the segments are processed in accordance to a fuzzy set algorithm.

U.S. Pat. No. 5,845,258, issued to Brian M. Kennedy on Dec. 1, 1998, is related to a computer based planning system where a plan is compared to system behavior and then the plan is adjusted according to a selected strategy.

U.S. Pat. No. 5,890,133, issued to Michael Ernst on Mar. 30, 1999, is related to a computer based method for dynamic optimization of business processes. The Method of Ernst uses parameters, process data and result data and uses stored data to identify a business process having propitious result data. The method of Ernst then requires that the parameters be modified according to the business process having propitious result data and the actual results to be verified subsequent to the modification of the parameters.

Canadian Patent Number 959169, issued to Jerry R. McIntyre et al. on Dec. 10, 1974, is related to a computer based method for calculating the fractions of various products within the product stream from a gas well in order to properly price the product stream as a function of the composition of the product stream and the market price of the product stream's various fractions.

None of the above inventions and patents, taken either singly or in combination, is seen to describe the instant invention as claimed.

SUMMARY OF THE INVENTION

The present invention is directed to a management tool that allows the electric utility manager to forecast the company's profit for every available strategy and combination of strategies for complying with the limits on pollutant emissions, and then to select the pollution control scheme that yields the maximum profit to the utility. In addition, the system of the present invention uses real time data to automatically update the input parameters to the decision making process and revise the forecasted outcomes for the various strategies considered. The management tool of the present invention may also include an optimization module which automatically determines the profit maximizing strategy and outputs the result to the utility manager.

The management tool of the present invention is implemented using a computer. The computer has communication capabilities which allow the computer to obtain real time data regarding a power plant∝s power output and pollutant emissions from remotely located sensors and/or control systems. The computer may also include communications links to the utility's administrative, financial, and archival computers in order to facilitate the inputting of historical and financial data that are needed to make projections or forecasts regarding energy production, profits or costs, and pollutant emissions. The present invention also includes one or more continuous emission monitors (CEMs) which are in constant communication with the computer.

Accordingly, it is a principal object of the invention to provide an interactive graphical tool for reviewing historical data and performing forecasting simulations relating to pollutant emissions from power plants and the like.

It is another object of the invention to provide a tool for simulating the outcomes of various pollution control strategies using real time data.

It is a further object of the invention to provide a management tool that allows the electric utility manager to forecast the company's profit for various pollution control strategies and to select the pollution control scheme that yields the optimal result for the electric utility company.

Still another object of the invention is to provide a management tool which automatically determines the optimum pollution control strategy and outputs the result to the utility company manager.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 2B is a detailed view of the first field of the display presented to a user for viewing and entering historical data for use in the emission management process of the present invention.

FIG. 2C is a detailed view of the second field of the display presented to a user for viewing and entering historical data for use in the emission management process of the present invention.

FIG. 2D is a detailed view of the third field of the display presented to a user for viewing and entering historical data for use in the emission management process of the present invention.

FIG. 2E is a detailed view of the fourth field of the display presented to a user for viewing and entering historical data for use in the emission management process of the present invention.

Similar reference characters denote corresponding features consistently throughout the attached drawings.

DETAILED DESCRIPTION OF THE PREFERRED EMBODIMENTS

Figure 1:
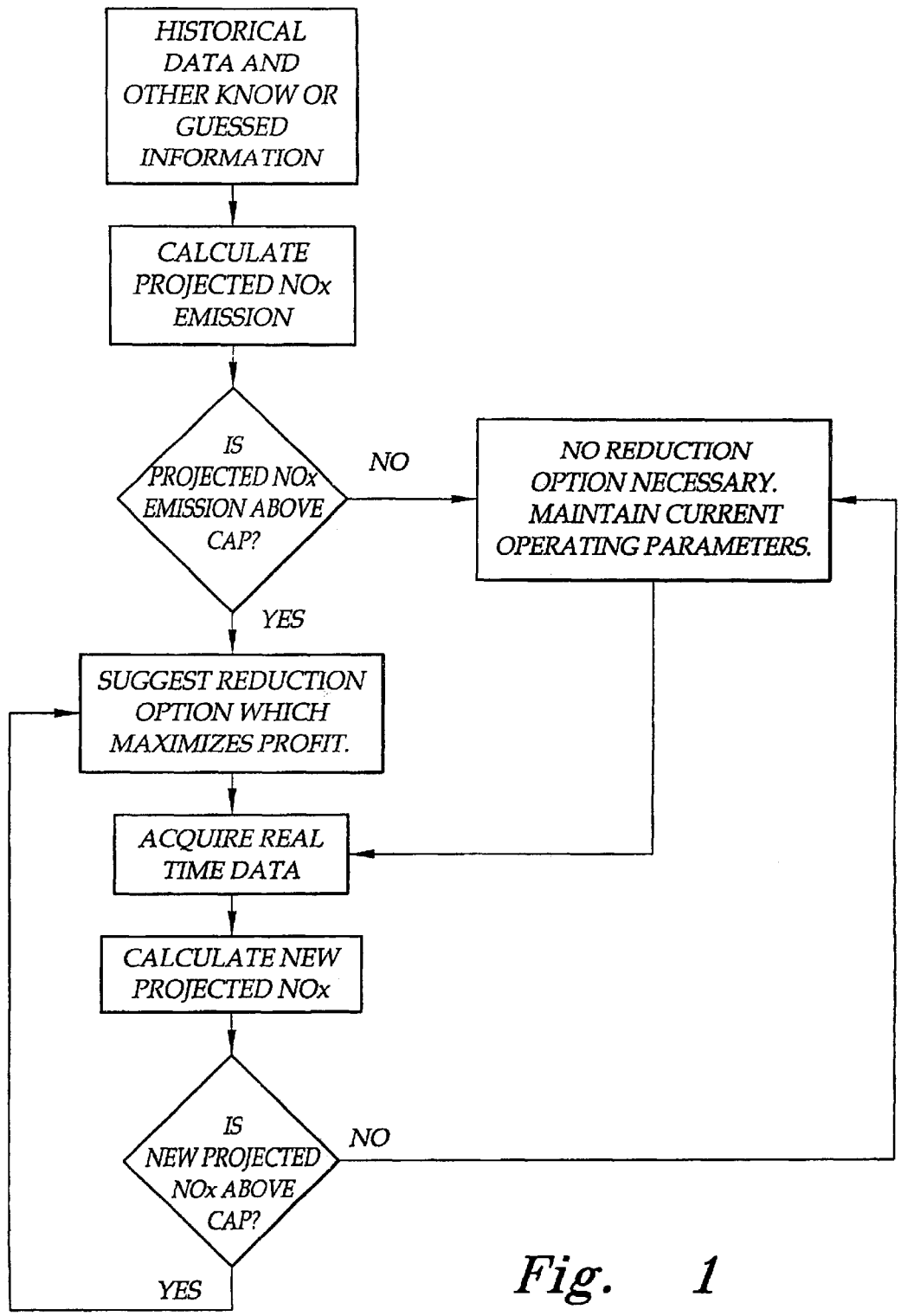
FIG. 1 is a flow chart showing the emission management process of the present invention.

The present invention relates to a computer based management system designed to aid managers of utilities and electric power generating plants in managing the emissions of pollutants from their plants. Stricter limitations on the amounts of pollutants and so called greenhouse gases have necessarily made pollutant emissions a controlling factor in management decisions regarding the operation of electric power plants. Power generated by burning fossil fuels leads to the production of the oxides of nitrogen, collectively referred to as $NO_x$. In addition, sulfurous compounds are emitted into the air by coal burning power plants. All fossil fuel burning power plants produce carbon monoxide (CO) and carbon dioxide ($CO_2$) as byproducts of the combustion process. Carbon monoxide is produced due to incomplete combustion of hydrocarbons, is toxic, and is generally produced in lesser amounts than $CO_2$. Carbon dioxide, while not toxic itself, has been implicated as a cause of global warming due to the greenhouse effect.

Restrictions on the amounts of the aforementioned substances that may be emitted are prescribed by law and are enforced by governmental agencies. The power plant manager has several options in reducing the emission rate of these pollutants in order to comply with existing regulations. The rate of emission of all these pollutants can be reduced by reducing the overall power output of the plant. The overall power output of the plant, and thus the pollutant output, can be reduced by planned outages and/or by purchasing power from elsewhere. Emission of sulfurous compounds such as $SO_2$ can be reduced by using gas scrubbers and/or by changing fuels from high sulfur coal to low sulfur coal or oil. Emission of nitrogen oxides can additionally be mitigated by operational changes affecting efficiency and/or combustion conditions of the power plant, by changing fuel types, and by installing Selective Catalytic Reduction (SCR) equipment. Increasing the proportion of air to fuel can help mitigate CO emissions. The emission of $CO_2$ can additionally be reduced by increasing the efficiency of the power generation process such that less fuel has to be burned for each megawatt of electricity generated. The efficiency of the power generation process can be increased by using technologies such as cogeneration and waste heat recovery.

With so many choices facing the power plant or electric utility manager in the effort to meet the cap on pollutant emissions, it becomes difficult for the manager to pick the right strategy or combination of strategies to maximize the profit to the electric utility while complying with the limits on the emission of pollutants. The present invention is a management tool that allows the electric utility manager to forecast the companies profit for every available strategy and combination of strategies for complying with the limits on pollutant emissions, and then to select the pollution control scheme that yields the maximum profit to the utility. In addition, the system of the present invention uses real time data to automatically update the input parameters to the decision making process and revise the forecasted outcomes for the various strategies considered. Furthermore, the management tool of the present invention may include an optimization module which automatically determines the profit maximizing strategy and outputs the result to the utility manager.

Figure 7:
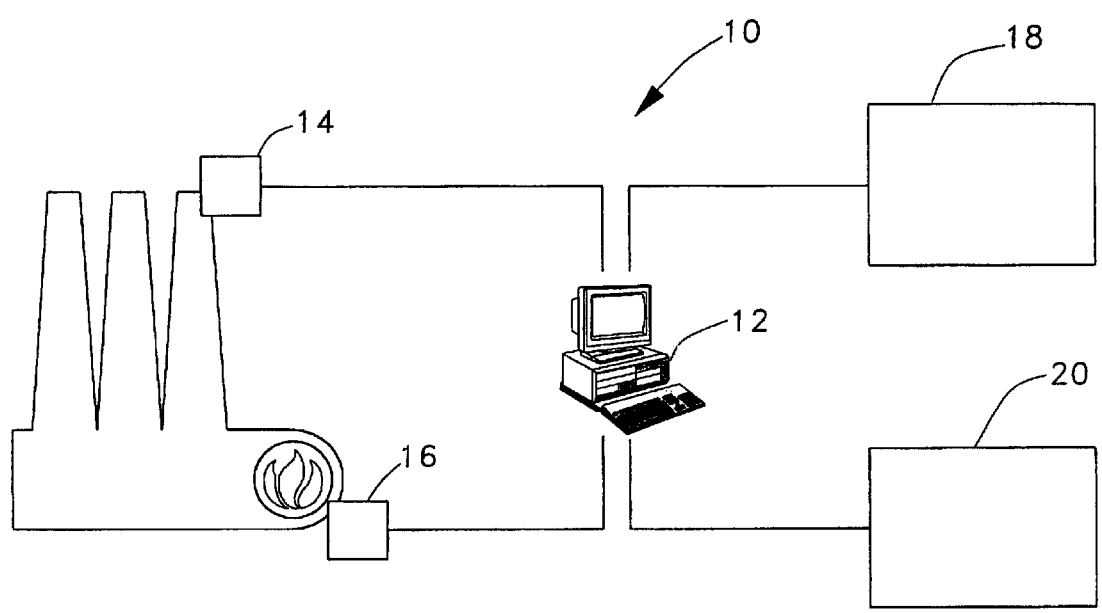
FIG. 7 is a diagrammatic view of the emissions management and policy making system of the present invention, showing the continuous emission monitoring device communicating with the computer programmed to forecast pollutant emissions.

The management tool 10 of the present invention is implemented using a computer system 12. The computer system 12, as shown in FIG. 7, is merely a diagrammatic representation. The actual computer system used to implement the present invention can be a microcomputer, a minicomputer, a mainframe computer, a computer network, a parallel processing computer, a multiprocessor computer, or any other suitable type of computer system. At a very minimum the computer system 12 includes at least one central processor unit (CPU), a mass storage device such as a hard disk, random access memory (RAM), an input device such as a keyboard, and an output device such as a monitor. In addition, the computer system 12 should include a communication capability in order to obtain real time data regarding a power plant's power output and pollutant emissions from remotely located sensors and/or control systems. The computer system 12 may preferably include a removable storage medium such as a floppy disk drive and/or communications links to the utility's administrative, financial, and archival computers in order to facilitate the inputting of historical and financial data that are needed to make projections or forecasts regarding energy production, profits or costs, and pollutant emissions.

The system 10 also includes one or more continuous emission monitors 14 (CEMs) and means 16 for continuously monitoring the power output of the generating plant. CEMs are well known and continuously measure the concentrations of selected pollutants in the discharge from the plant's smokestacks. The means 16 can simply be the equipment already being used to provide power output readings to the plant's control room, with the added capability of communicating the power output data in real time to the computer system 12.

Input data 18 includes all the historical data, all the cost data, all the customer data, and all the price data that are needed to initially calculate projected output, emissions, and profits. Input data 18 also includes operational limitations and constraints, including the available pollutant emission reduction options, that are specific to the particular plant under consideration. The input data 18 are used in conjunction with the real time data from the power output measuring means 16 and the CEMs 14. The outputs 20 of the system 10 include the plant operational parameters, the costs associated with those operational parameters, the net profit associated with those operational parameters, and the pollutant emissions associated with those operational parameters.

Figure 2A:
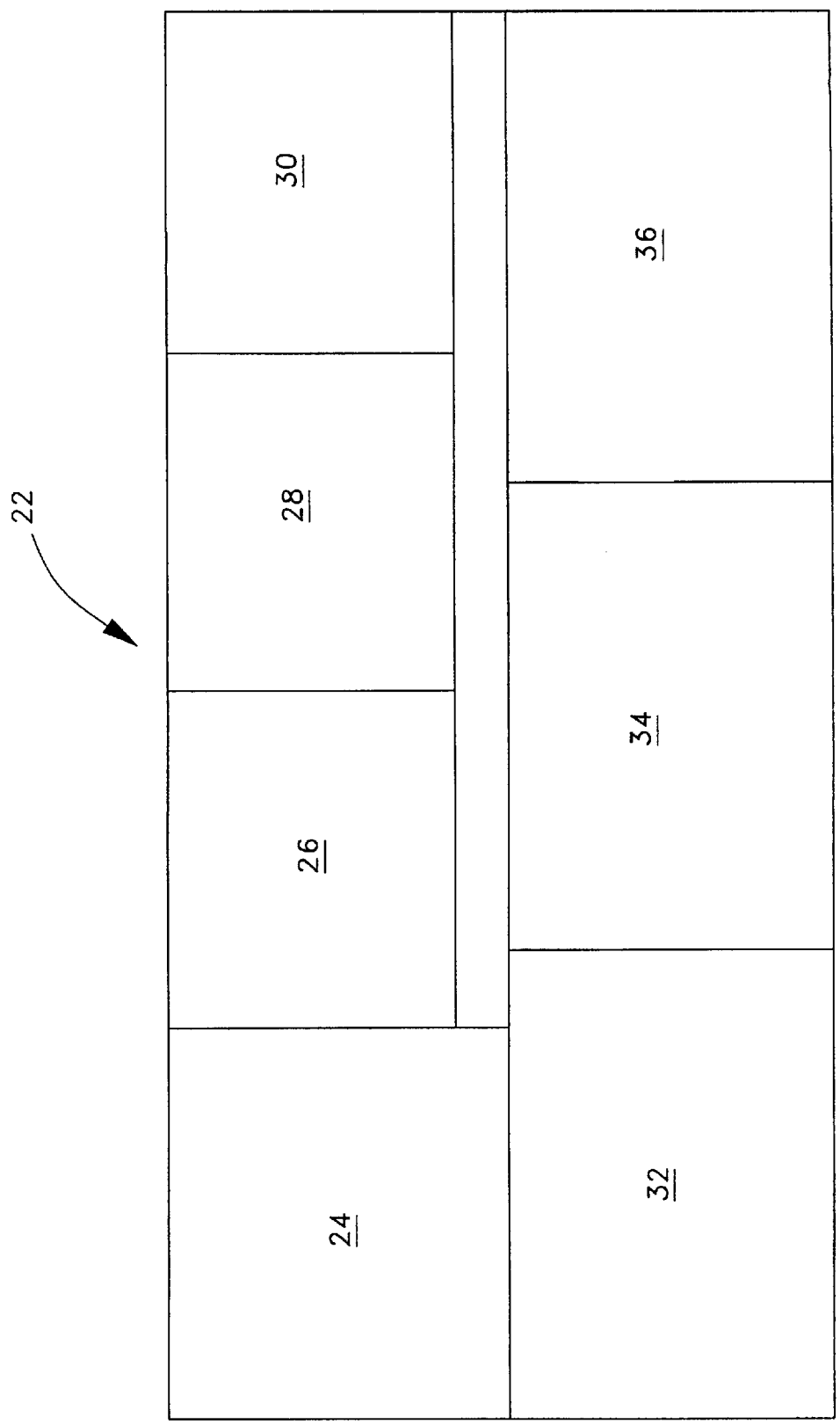
FIG. 2A is a diagram showing the layout of the display presented to a user for viewing and entering historical data for use in the emission management process of the present invention.

Referring to FIG. 1, the overall process of the present invention for managing emissions can be seen. FIGS. 2A–2H and 3–6 show the various input and output screens that are presented to the plant operator or user on the screen or monitor of the computer 12. The process begins by entering the necessary historical data and other known or guessed information into the computer 12. FIG. 2A shows the screen 22 presented to the user or plant operator so that the operator or user can input, browse, and verify the historical data. The screen 22 has seven fields 24, 26, 28, 30, 32, 34, and 36, arranged as shown in FIG. 2A.

Referring to FIG. 2B, the details of the field 24 can be seen. The field 24 is an interactive display having several subfields which allow the user to specify a particular unit of a particular power station for which historical data are to be displayed. Each subfield within the field 24 has a scroll button 38 which allows the user to view a list of options for that particular subfield and to then pick the appropriate option from the list, or the user may specify a value or option for a subfield by typing that value into the box for that subfield. The user can specify the name of the unit for which historical data are to be displayed by inserting the name of the particular unit into the box 40. In the example illustrated in FIG. 2B, station F-Unit 2 has been specified by the user.

Each electric utility encompasses several power stations with each power station being formed by several electrical generating units. Usually, each unit includes a steam generator which can be fired by coal, oil, or both. Alternatively, the unit may be a gas turbine which powers a generator directly. In addition to the type of fuel, the rate at which pollutants are emitted by a unit, for a given power output, is also affected by the design or model of the particular electrical generating unit. Subfield or box 42 allows the user to enter the unit type or model for the particular unit under consideration. The information entered in subfield 42 allows the computer to generate and maintain a database regarding the operating characteristics of the particular unit type using historical information, or the unit type may be used to access data regarding the operating characteristics of the particular unit type that may have been preprogrammed into the computer as an add-on module to the program being executed by the computer 12. Such information may for example be supplied by the unit's vendor. Furthermore, the subfield 42 identifies the physical nature of the particular unit under consideration to the computer system 12.

The subfield 44 allows the location of the unit to be entered into the computer. Subfield 46 allows the user to specify a type of fuel. Subfield 46 allows the user to limit the historical data displayed to data obtained while the chosen unit was being powered by the specified fuel. Subfields 48 to 52 allow the user to specify the time period for which historical data are to be displayed. Subfield 48 specifies that historical data are to be displayed for the selected quarter of the year, and the subfield 48 can have the values one, two, three, and four which refer to the first, second, third, and fourth quarter of the year, respectively. Subfield 50 specifies a season as the period for which historical data are to be displayed. The options for the subfield 50 can be spring, summer, fall, and winter or user defined seasons such as the ozone season which runs from May 1st to September 30th of each year. Subfield 52 specifies a particular month as the period for which historical data are to be displayed. In the example illustrated in FIG. 2B, September has been specified by the user.

The subfield 54 allows the user to specify the type of display that is used to present the historical data. For example, the user may choose to have average values, for power generated and pollutants emitted during the specified period, displayed as a function of the hour of the day. Alternatively, the user may choose to have daily averages, for power generated and pollutants emitted, for each day of the specified period displayed chronologically. The subfield 56 allows a user to specify a particular day of the week for which historical data, averaged over the previously specified time period, are to be displayed. For example, if Thursday was selected, then power generated and pollutants emitted, averaged over all the Thursdays in the specified period, would be displayed as a function of the hour of the day. The subfield 58 allows the user to specify a particular calendar date for which hourly values for the power generated and the pollutants emitted are to be displayed for the entire 24 hour period covered by that date.

Referring to FIG. 2C, a detailed view of the field 26 of the display 22 can be seen. The field 26 has a first subfield 60 and a second subfield 62. The subfield 60 displays a summary of the values for $NO_x$ emissions for the time period specified by the user in field 24. Displayed in the subfield 60 are the average rates of $NO_x$ emissions, for the user specified time period, expressed in three different units. The first number shows the average $NO_x$ emission expressed as the mass of $NO_x$ produced per unit of heat input into the process. The mass of $NO_x$ is expressed in pounds and the heat input is expressed in millions of British Thermal Units. The second number in the subfield 60 is the average rate of $NO_x$ emission, for the specified period, expressed in pounds per hour. The third number in the subfield 60 is the average rate of $NO_x$ emission, for the specified period, expressed in tons per hour. The bottom entry in the subfield 60 is the cumulative or total amount of nitrogen oxides produced over the specified period in units of tons. Subfield 62, titled gross generation information, shows the average power output for the specified period in megawatts. Subfield 62 also shows the cumulative or total amount of energy produced over the specified period in units of megawatt hours.

The averages displayed on the screen 22 are calculated from the historical data using well known techniques. For example, to calculate the average rate of $NO_x$ production in lbs/hr, the instantaneous rate of $NO_x$ production in lbs/hr, as reported by the CEM devices, is plotted as a function of time (in units of hours) for the specified time period. The area under this curve gives the total amount of $NO_x$ produced or emitted over the entire duration of the specified period. This total amount of $NO_x$ is then divided by the duration of the specified period in hours in order to obtain the average rate of $NO_x$ production in lbs/hr.

Referring to FIG. 2D, a detailed view of the field 28 of the display 22 can be seen. The field 28 has a first subfield 64 and a second subfield 66. The subfield 64 displays a summary of the values for $SO_2$ emissions for the time period specified by the user in field 24. Displayed in the subfield 64 are the average rates of $SO_2$ emissions, for the user specified time period, expressed in three different units. The first number shows the average $SO_2$ emission expressed as the mass of $SO_2$ produced per unit of heat input into the process. The mass of $SO_2$ is expressed in pounds and the heat input is expressed in millions of British Thermal Units. The second number in the subfield 64 is the average rate of $SO_2$ emission, for the specified period, expressed in pounds per hour. The third number in the subfield 64 is the average rate of $SO_2$ emission, for the specified period, expressed in tons per hour. The bottom entry in the subfield 64 is the cumulative or total amount of nitrogen oxides produced over the specified period in units of tons. Subfield 66, titled heat input information, shows the average heat input rate for the specified period in millions of BTUs per hour. Subfield 66 also shows the cumulative or total amount of heat input to the electric generation process over the specified period in units of millions of BTUs.

Referring to FIG. 2E, a detailed view of the field 30 of the display 22 can be seen. The field 30 has a first subfield 68 and a second subfield 70. The subfield 68 displays a summary of the values for $CO_2$ emissions for the time period specified by the user in field 24. Displayed in the subfield 68 are the average rates of $CO_2$ emissions, for the user specified time period, expressed in three different units. The first number shows the average $CO_2$ emission expressed as the mass of $CO_2$ produced per unit of heat input into the process. The mass of $CO_2$ is expressed in pounds and the heat input is expressed in millions of British Thermal Units. The second number in the subfield 68 is the average rate of $CO_2$ emission, for the specified period, expressed in pounds per hour. The third number in the subfield 68 is the average rate of $CO_2$ emission, for the specified period, expressed in tons per hour. The bottom entry in the subfield 68 is the cumulative or total amount of carbon dioxide produced over the specified period in units of tons. Subfield 70, titled operating information, shows the number of hours that the unit has been in operation over the specified period and the number of data points for this period. In the illustrated example emission and power output readings are available for every hour that the unit was in operation.

Figure 2F:
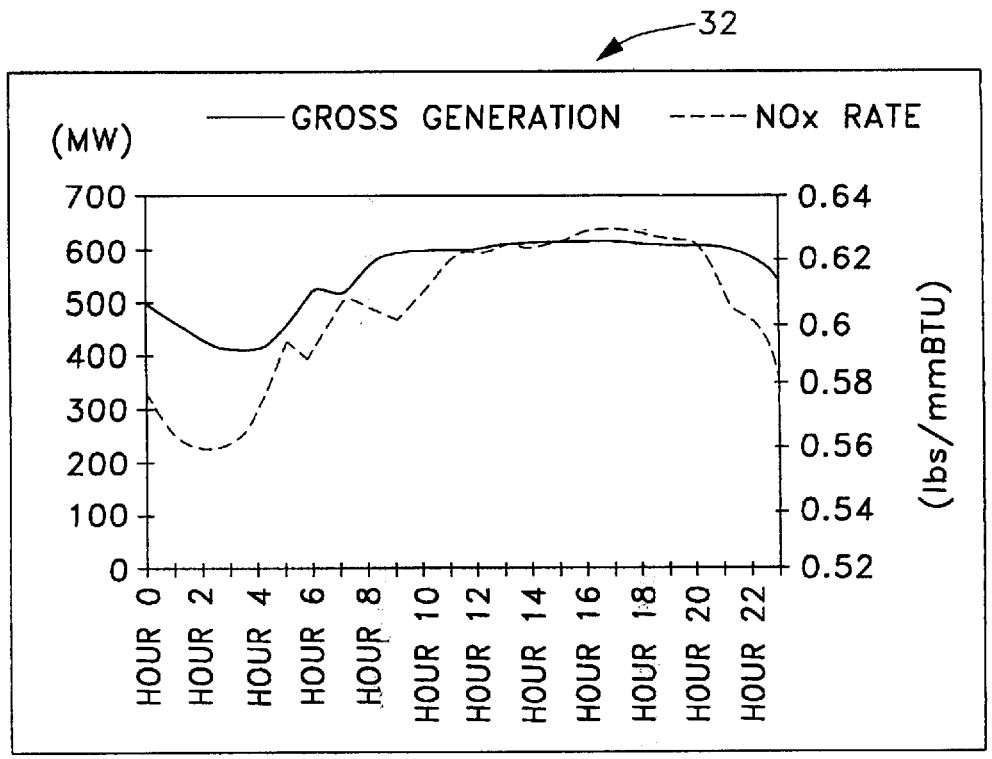
FIG. 2F is a detailed view of the fifth field of the display presented to a user for viewing and entering historical data for use in the emission management process of the present invention.

Referring to FIG. 2F, a detailed view of the field 32 of the display 22 can be seen. Field 32 generally shows the curve for the $NO_x$ rate in lbs/mmBTU superimposed on the gross generation in megawatts as functions of time. This type of representation allows the degree of correlation between the gross generation and the $NO_x$ emission rate to be visualized by the user. The horizontal axis of the graph in field 32 is in units of time. Depending upon the time period specified by the user, the horizontal axis may be marked in hours, days, or months of the year. Also, depending on the display type specified in subfield 54, the data for each hour of the day may be averaged over every day in the time period specified by the user and the results displayed with hours on the horizontal axis of the graph in field 32.

Figure 2G:
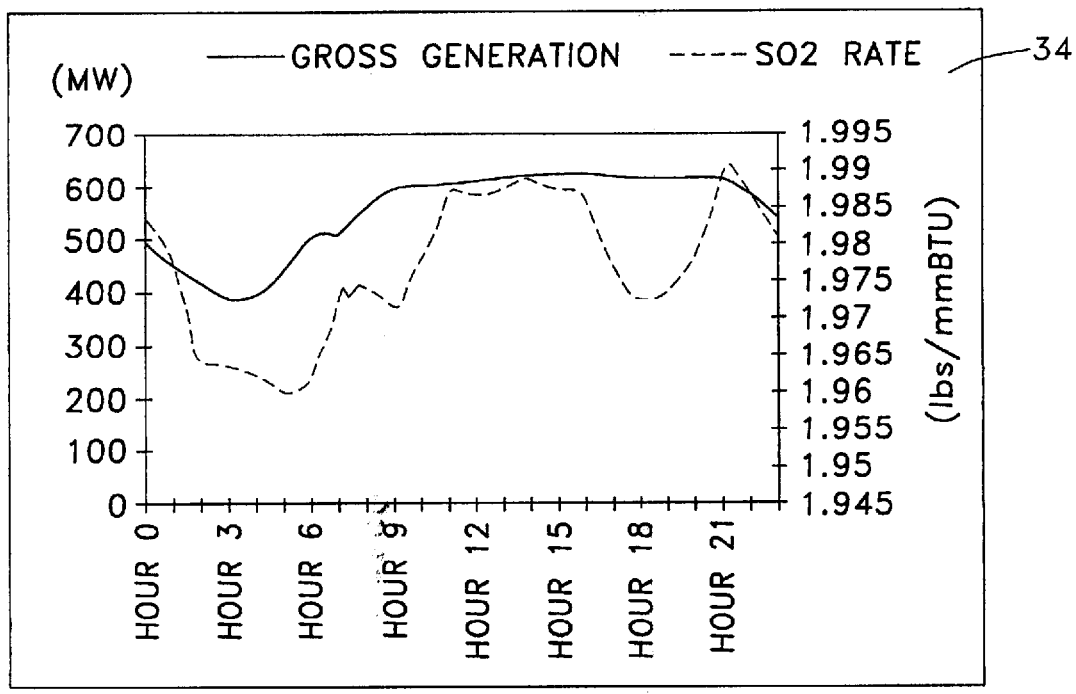
FIG. 2G is a detailed view of the sixth field of the display presented to a user for viewing and entering historical data for use in the emission management process of the present invention.

Referring to FIG. 2G, a detailed view of the field 34 of the display 22 can be seen. Field 34 generally shows the curve for the $SO_2$ rate in lbs/mmBTU superimposed on the curve for the gross generation in megawatts as functions of time. This type of representation allows the degree of correlation between the gross generation and the $SO_2$ emission rate to be visualized by the user. The horizontal axis of the graph in field 34 is in units of time. Depending upon the time period specified by the user, the horizontal axis may be marked in hours, days, or months of the year. Also, depending on the display type specified in subfield 54, the data for each hour of the day may be averaged over every day in the time period specified by the user and the results displayed with hours on the horizontal axis of the graph in field 34.

Figure 2H:
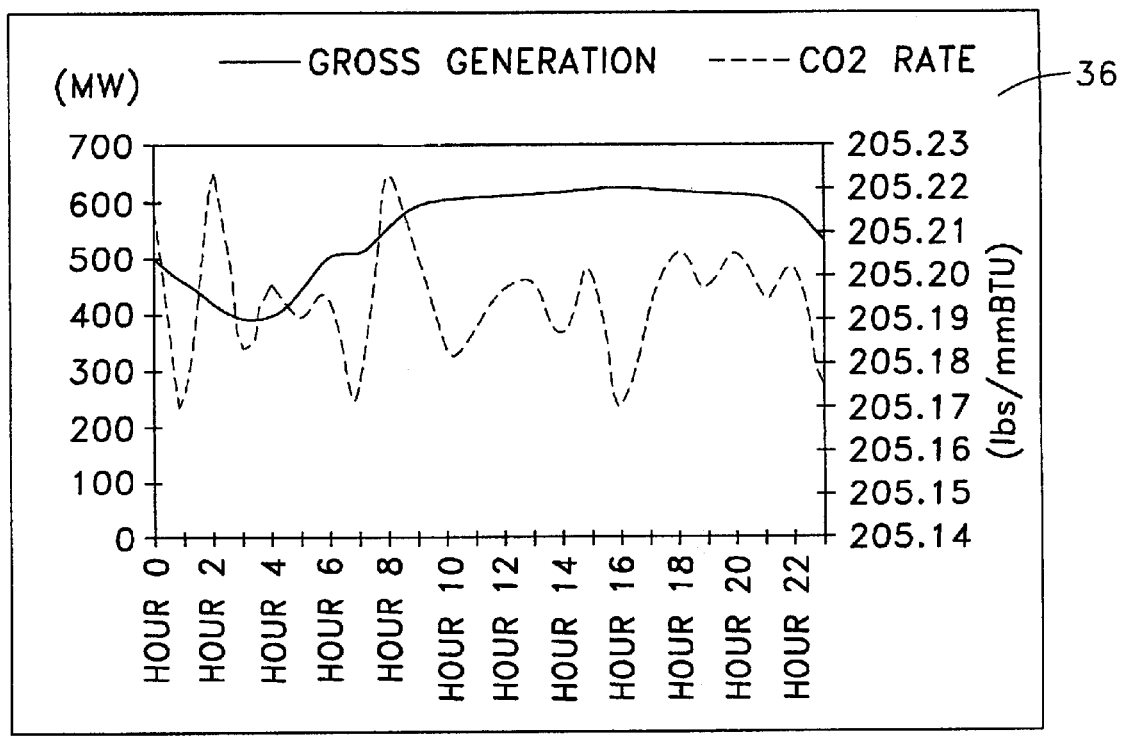
FIG. 2H is a detailed view of the seventh field of the display presented to a user for viewing and entering historical data for use in the emission management process of the present invention.

Referring to FIG. 2H, a detailed view of the field 36 of the display 22 can be seen. Field 36 generally shows the curve for the $CO_2$ rate in lbs/mmBTU superimposed on the curve for the gross generation in megawatts as functions of time. This type of representation allows the degree of correlation between the gross generation and the $CO_2$ emission rate to be visualized by the user. The horizontal axis of the graph in field 36 is in units of time. Depending upon the time period specified by the user, the horizontal axis may be marked in hours, days, or months of the year. Also, depending on the display type specified in subfield 54, the data for each hour of the day may be averaged over every day in the time period specified by the user and the results displayed with hours on the horizontal axis of the graph in field 36.

Figure 3:
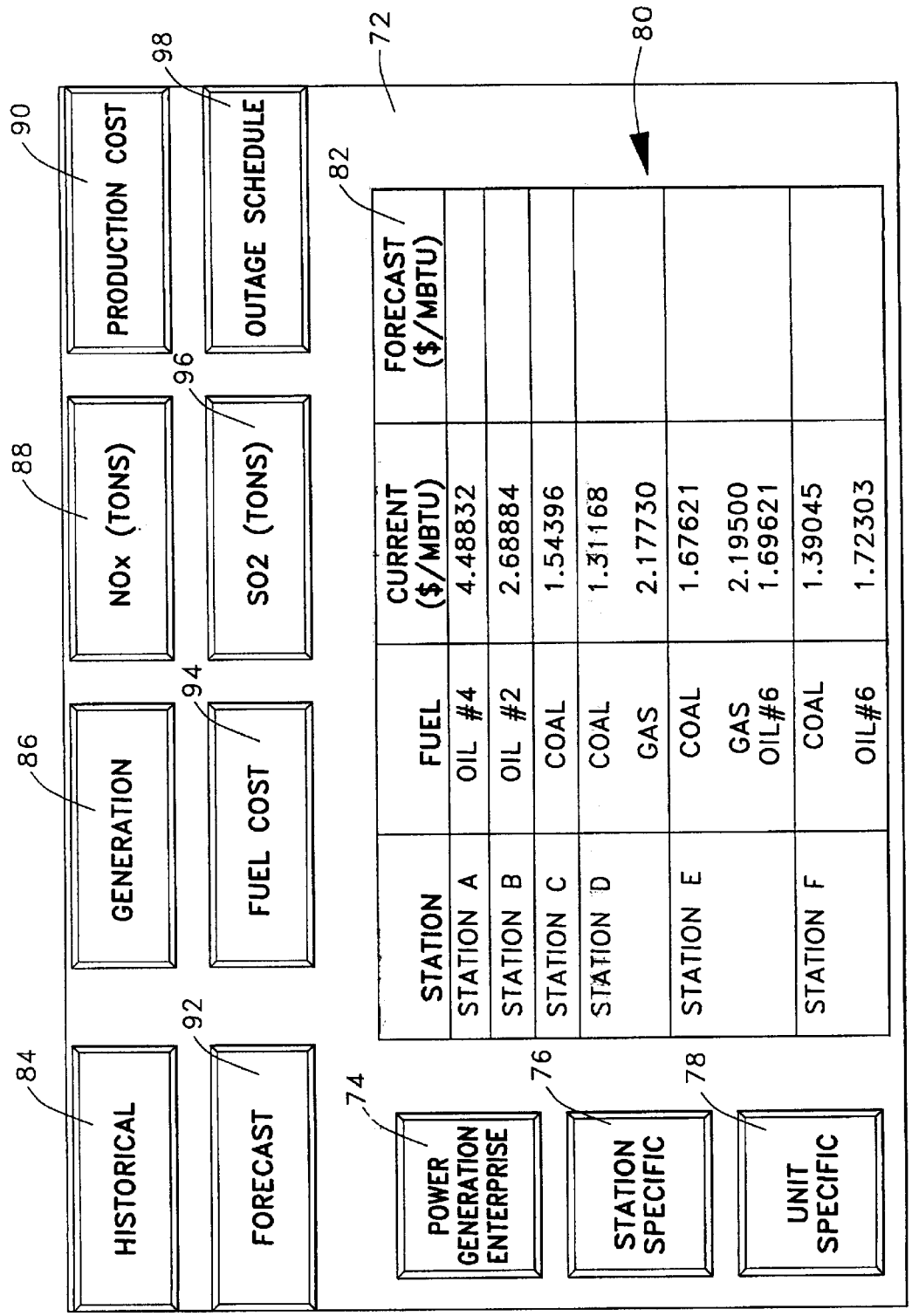
FIG. 3 is a diagrammatic view of the screen presented to the user for inputting fuel costs.

Referring to FIG. 3, the screen 72 presented to the user for inputting, browsing, or verifying fuel costs can be seen. The screen 72 has three simulated buttons 74, 76, and 78 which are arranged vertically on the left side of the screen. To the right of the simulated buttons 74, 76, and 78 is a table 80 displaying current fuel types and costs per unit of heat value. The table 80 also has a column 82 for forecasted fuel costs expressed in dollars per unit of heat value. The table 80 shows fuel costs on an enterprise-wide basis, displaying fuel costs for each power station within the entire electric utility. The table 80 can be edited by the user if changes to the fuel costs are necessary. Also the user can enter forecasted fuel costs in column 82 if the user has forecasted fuel costs available to him or her. Alternatively, forecasted fuel costs can be obtained automatically from other computers within the enterprise, or forecasted fuel costs may be obtained on-line from a fuel vendor. Eight simulated buttons 84, 86, 88, 90, 92, 94, 96, and 98 are provided near the top of the screen 72 and allow the user to navigate to other screens such as the historical data screen 22 or screens showing forecasted pollutant emissions.

Figure 4:
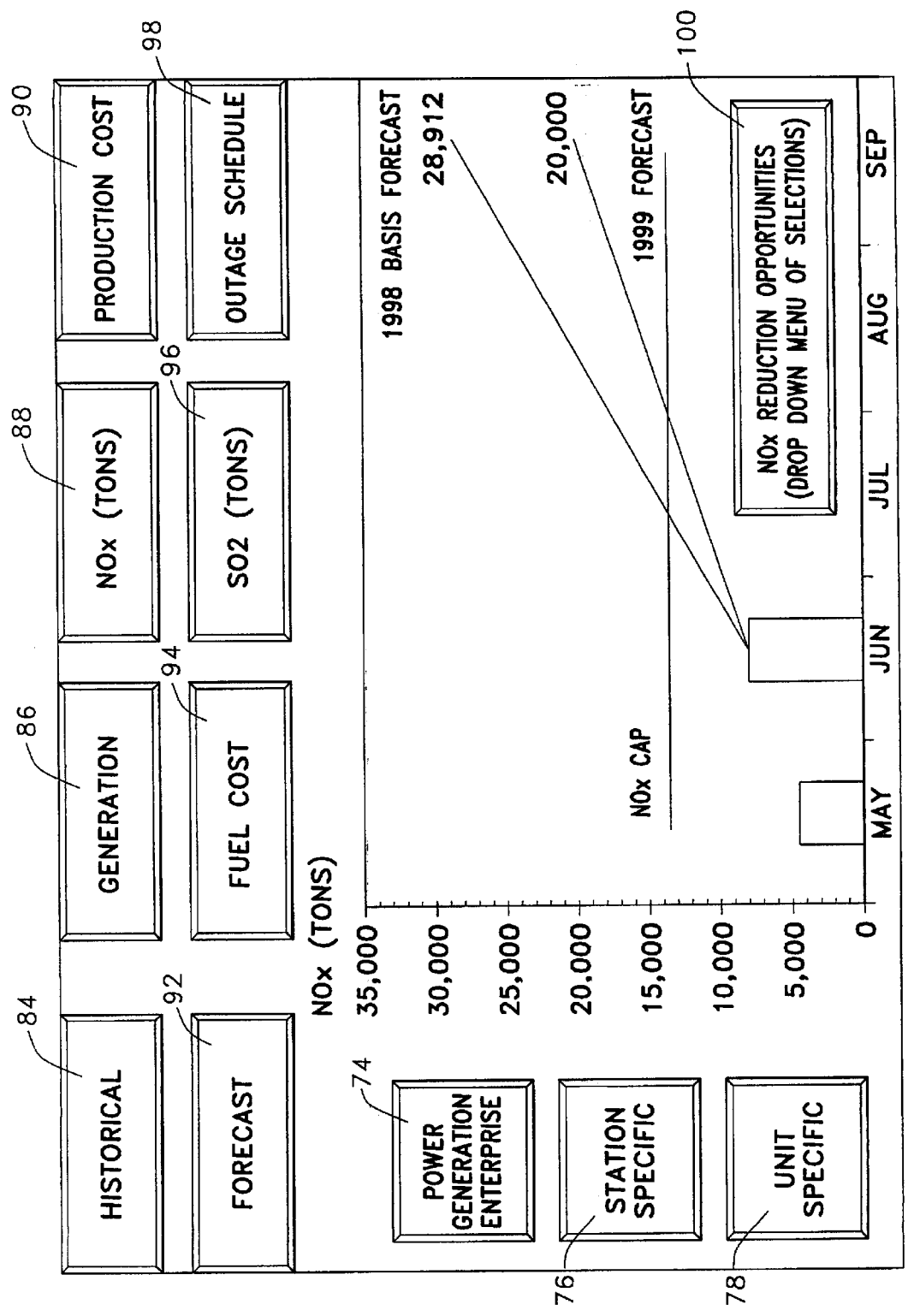
FIG. 4 is a diagrammatic view of the screen for displaying the results of pollutant emission projections for the entire utility to a user.

The first step in the pollution management process of the present invention is to calculate a projected energy demand for a time period specified by the user using the historical data regarding power demand for the prior calendar year. For example, if the user required a projection of the power demand over the ozone (May 1st to September 30th) season in 1999, then the power demand for each day of the ozone season of 1998 is divided by the number of customers at that time and multiplied by the number of current customers to obtain a projected demand for electricity for the 1999 ozone season. The historical data also provides a computer model of power plant operations. For example, for the same unit type and fuel as currently under consideration, the 1998 data can be used to obtain the rate at which a particular pollutant is emitted per megawatt of output for a given unit using a given fuel. Multiplying this rate by the projected demand for each day of the specified time period in 1999 gives the projected average daily rate of pollutant emission for the specified time period in 1999. Mathematically integrating the projected average daily rate of pollutant emission as a function of time yields a curve indicating the total mass of the particular pollutant emitted as a function of time. This curve is called the 1998 basis forecast for the particular pollutant under consideration. An example of such a curve, labeled 1998 basis forecast, showing the projected $NO_x$ emissions for the entire power generation enterprise or utility is illustrated in FIG. 4. The graph in FIG. 4 also illustrates the $NO_x$ cap that has been imposed by regulatory agencies for the year 1999. To navigate to the graph in FIG. 4, the user would click the button 92 with a pointing device such as a mouse and then click the button 74 to view the forecasted $NO_x$ emissions on an enterprise-wide basis. After clicking the button 92 the user would ordinarily be presented with a list of pollutants from which the user can select a particular pollutant for analysis.

A simulated button 100 is displayed at the bottom right of the graph in FIG. 4. clicking the button 100 presents a drop down menu to the user which contains the various actions that can be taken to reduce the amount of the particular pollutant emitted. The menu activated by button 100 has a list of entries for every unit within the enterprise. The list of entries for each unit includes a menu item for each type of fuel that can be used by the particular unit. The fuel type currently being used would be highlighted. The list of entries for each unit would also include option for changing unit type, adding a scrubber, adding a SCR, and adding ancillary equipment as part of a cogeneration scheme. These latter options are referred to as capital improvements. Other options presented to the user include an outage schedule for the unit and unit start-up and shutdown. The reduction options menu would also include enterprise-wide options such as purchasing power from outside the enterprise, viewing an inventory of emission allowances, and buying or selling emission allowances.

In the example illustrated in FIG. 4 the 1998 basis forecast obviously exceeds the $NO_x$ cap. The utility administrator must take some action to lower the projected $NO_x$ emission. For example, the administrator may elect to switch the fuel in some of the units from coal to oil which is a cleaner burning fuel. Upon this change in operating parameters, the computer will recalculate the $NO_x$ output for those units whose fuel has been changed. This recalculation is accomplished using the same technique as was used previously, except that the daily average rate of pollutant emission per megawatt generated, used in the recalculation, is that for the new fuel. The computer model of plant operations, based on the historical data, is again used to empirically determine the daily average rate of pollutant emission per megawatt generated. The new curve for the projected $NO_x$ emissions, labeled 1999 forecast, is also displayed on the same graph shown in FIG. 4 so that the user can readily visualize the effects of the selected emission reduction options.

As can be seen from FIG. 4, the new projections, using the new fuel, indicate that a lesser amount of pollutant will be emitted by the electric utility. However, the new projections also exceed the emission cap, and therefore the administrator or user will have to repeat the process by selecting a new set of emission reduction options and viewing the new projected emission curve to see if the new projected emissions are in compliance with the emissions cap. This same iterative process can be performed for all the pollutant species of interest. Once the emission reduction options which yield emissions that are in compliance with the emission caps have been identified, then the user or administrator dispatches the new operating parameters to the unit operators to ensure the compliance of the utility with the mandated emission caps.

Cleaner burning fuels are generally more expensive than the dirtier fuels, capital improvements require huge investments of funds, buying emission allowances or power from other sources costs money, and planned outages result in lost revenue. In short, any emission reduction option entails some costs which detrimentally affect the utility's profits. Further, a substantial number of different pollution control options may lead to the desired reduction in pollutant emissions, however, each option will have a different impact on the company's profits. Therefore, the administrator or manager of the utility must perform the above described emissions forecasting procedure for every available pollution reduction scenario, and select the pollution reduction scenario that results in emissions below the mandated emissions caps and that has the least negative impact on the company's profits.

This optimization process is not as daunting as it may first appear. As a practical matter, not every conceivable pollution reduction option is available for solving a particular emission control problem. For example, if pollutant emissions must be reduced over a given period which starts two months from now, then purchasing new capital equipment which may take years to install is not an available option. Also, for a plant that is along an inland waterway, it may take months for a fuel shipment to reach such a plant by barge. Therefore, a fuel switch may not be a viable short term solution for such a power plant. On the other hand, for a plant which receives fuel by a permanent pipeline from a tank farm located near an oceanside tanker terminal, a fuel switch could be effected immediately. Therefore, the actual number of combinations of pollution reduction options that are available for dealing with a particular pollution reduction problem is usually small enough such that the user can work through each combination of options one by one until he or she arrives at the optimum solution. Because the computer 12 is already programmed with the fuel prices, the cost of capital improvements as provided by equipment vendors, and the rate the utility charges its customers, the cost of each pollution control scenario can be automatically calculated by the computer and displayed to the utility's manager so that the manager can select the scenario with the lowest cost to the utility.

Nevertheless, going through each iteration of the optimization process would still present a very tedious undertaking. The control program of the computer 12 can be readily modified to automatically perform this optimization process, and therefore relieve the user of this tedious task. The automatic optimization can be accomplished by adding an index controlled loop that calculates the attendant cost for every combination of available pollution control options and stores the indices for each combination of options whose cost is lower than the cost of the preceding combination of option. Once the loop has executed for all available combinations of options, then the stored indices point to the combination of options with the lowest cost.

Other variables that can affect the choice of a pollution control scenario are emission allowances and the purchasing of power from outside sources. Emission allowances are created when a utility has been able to produce its needed generation requirements without the pollutants it has emitted reaching the mandated caps. This utility can then sell its right to emit additional pollutants to other utilities which will not be able to meet the caps using their available option. Emission allowances are traded in 1000 lb units and their price is usually set by brokers. Purchasing emission allowances can be treated as just another emission reduction option with an attendant cost and factored into the control program of the computer 12. Purchasing power from outside sources can also be handle in the same way. The market clearing price of purchased power is also set by special brokers and can be supplied to the computer 12 as part of the input data 18.

In addition to executing the control program described above, the computer 12 is continually receiving real time data from the CEM devices 14 and the power output measuring means 16. This real time data is added to the computer's data base to allow for more accurate determination of the empirically obtained pollutant emission rates. Also the real time data is continually compared to the projected values to obtain correction factors that can be used to further refine the computer projections.

Figure 5:
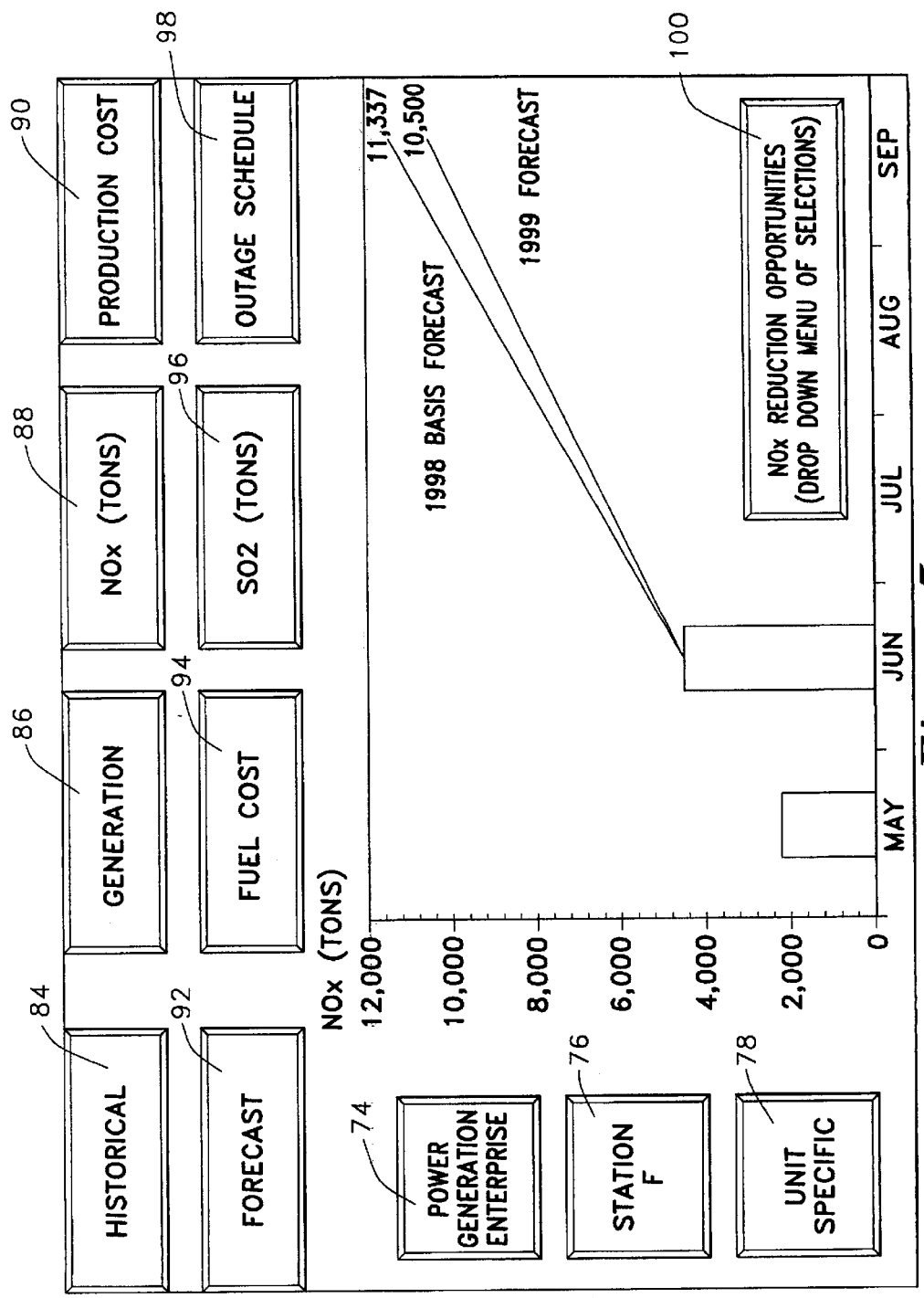
FIG. 5 is a diagrammatic view of the screen for displaying the results of pollutant emission projections for one power station to a user.
Figure 6:
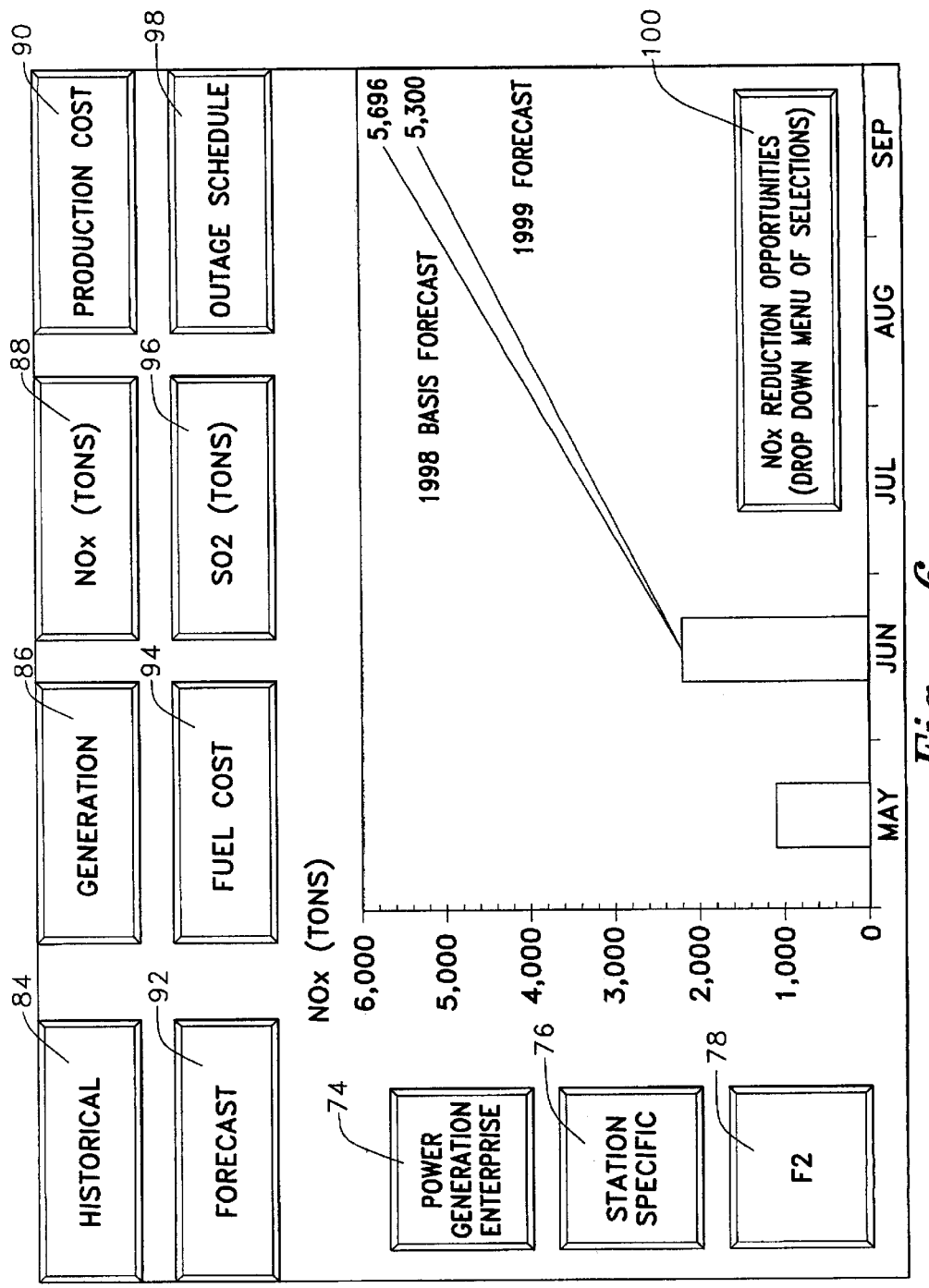
FIG. 6 is a diagrammatic view of the screen for displaying the results of pollutant emission projections for one unit within the power station to a user.

Clicking the button 76 presents the user with a list of power stations that make up the utility generation capability. The user can then select an individual power station for which projection emission curves, similar to those of FIG. 4, are to be generated. These projected emission curves for an individual power station are shown in FIG. 5. Clicking the button 78 presents the user with a list of units within the chosen power station. The user can then select an individual unit for which projected emission curves are to be generated. These projected emission curves for an individual unit are shown in FIG. 6.

It is to be understood that the present invention is not limited to the embodiments described above, but encompasses any and all embodiments within the scope of the following claims.

I claim:

1. A computerized method for determining the optimum strategy for controlling pollutant emissions from an electric power generating plant, the method comprising the steps of:
   providing a historical data base for the electric power generating plant;
   providing real time data;
   predicting projected power generation requirements for a user specified future time period by using the historical data base and the real time data;
   calculating a baseline projected emission rate for each pollutant over the user specified future time period using the projected power generation requirements;
   displaying the baseline projected emission rate for each pollutant over the user specified future time period to a user;
   displaying a pollutant emission limit for each pollutant over the user specified future time period;
   displaying a list of pollution control options to the user;
   calculating a projected emission rate for each pollutant over the user specified future time period for a user selected pollution control option; and
   displaying the projected emission rate over the user specified future time period for the user selected pollution control option.

2. The computerized method of claim 1, wherein said step of providing a historical data base includes providing information as to hourly power generated, hourly amounts for each pollutant emitted, operating parameters of the electric power generating plant for each data point in the historical data base, and the type of fuel used for each data point in the historical data base for a first one year period.

3. The computerized method of claim 1, wherein said step of providing real time data includes providing data on current power output, current emission rate for each pollutant emitted, current operating parameters of the electric power generating plant, and current type of fuel being used.

4. The computerized method of claim 1, wherein said steps of displaying the baseline projected emission rate, displaying a pollutant emission limit, and displaying the projected emission rate include displaying on a graph for each pollutant.

5. The computerized method of claim 1, wherein said steps of predicting projected power generation requirements, calculating a baseline projected emission rate, displaying the baseline projected emission rate, displaying a pollutant emission limit, displaying a list of pollution control options, calculating a projected emission rate, and displaying the projected emission rate are performed by a computer having a display screen.

6. A method for determining the optimum strategy for controlling pollutant emissions from an electric power generating plant, the method comprising the steps of:

providing a historical data base for the electric power generating plant including hourly power generated, hourly amounts for each pollutant emitted, operating parameters of the electric power generating plant for each data point in the historical data base, and type of fuel used for each data point in the historical data base for a first one year period;

providing real time data including current power output, current emission rate for each pollutant emitted, current operating parameters of the electric power generating plant, and current type of fuel being used;

predicting projected power generation requirements for a user specified future time period by using the historical data base and the real time data;

calculating a baseline projected emission rate for each pollutant over the user specified future time period using the projected power generation requirements;

displaying the baseline projected emission rate for each pollutant over the user specified future time period to a user, the baseline projected emission rate being displayed in a graph for each pollutant;

displaying a pollutant emission limit for each pollutant over the user specified future time period on the graph for each pollutant;

displaying a list of pollution control options to the user;

calculating a projected emission rate for each pollutant over the user specified future time period for a user selected pollution control option; and displaying the projected emission rate for each pollutant over the user specified future time period for the user selected pollution control option on the graph for each pollutant, said steps of predicting projected power generation requirements, calculating a baseline projected emission rate, displaying the baseline projected emission rate, displaying a pollutant emission limit, displaying a list of pollution control options, calculating a projected emission rate, and displaying the projected emission rate being performed by a computer having a display screen.

7. A system for determining the optimum strategy for controlling pollutant emissions from an electric power generating plant, the system comprising:

at least one continuous emission monitoring device positioned proximate a site of pollutant emission within the electric power generating plant;

means for measuring power output from the electric power generating plant;

a computer system having memory means, processor means, display means, input means, first communication means communicating with said continuous emission monitoring device, and a second communication means communicating with said means for measuring power output;

a historical data base for the electric power generating plant including hourly power generated, hourly amounts for each pollutant emitted, operating parameters of the electric power generating plant for each data point in said historical data base, and type of fuel used for each data point in said historical data base being stored in said memory means for a first one year period;

real time data including current power output, current emission rate for each pollutant emitted, current operating parameters of the electric power generating plant, and current type of fuel being used, being received from said continuous emission monitoring device and said means for measuring power output and being stored in said memory means on a continuing basis;

said memory means also storing a control program which operates said processor means;

said processor means operating to predict projected power generation requirements for a user specified future time period by using said historical data base and said real time data;

said processor means operating to calculate a baseline projected emission rate for each pollutant over the user specified future time period using said projected power generation requirements;

said processor means operating said display means to display said baseline projected emission rate for each pollutant over the user specified future time period to a user, said baseline projected emission rate being displayed in a graph for each pollutant;

said processor means operating said display means to display a pollutant emission limit for each pollutant over the user specified future time period on said graph for each pollutant;

said processor means operating said display means to display a list of pollution control options to the user;

said processor means operating to calculate a projected emission rate for each pollutant over the user specified future time period for a user selected pollution control option; and said processor means operating said display means to display said projected emission rate for each pollutant over the user specified future time period for the user selected pollution control option on said graph for each pollutant.

* * * * *